(12) United States Patent
Simmons et al.

(10) Patent No.: US 6,891,346 B2
(45) Date of Patent: May 10, 2005

(54) COMMUTATION AND VELOCITY CONTROL SYSTEM FOR A BRUSHLESS DC MOTOR

(75) Inventors: Howard Simmons, Barkhamstead, CT (US); John E. Games, Granby, CT (US)

(73) Assignee: Hamilton Sundstrand Corporation, Windsor Locks, CT (US)

( * ) Notice: Subject to any disclaimer, the term of this patent is extended or adjusted under 35 U.S.C. 154(b) by 0 days.

(21) Appl. No.: 10/039,235

(22) Filed: Dec. 31, 2001

(65) Prior Publication Data

US 2004/0150362 A1 Aug. 5, 2004

Related U.S. Application Data

(60) Provisional application No. 60/259,354, filed on Dec. 30, 2000.

(51) Int. Cl.$^7$ ................................................ H02P 5/00
(52) U.S. Cl. ....................... 318/439; 318/254; 318/138; 388/801; 388/808; 388/809; 388/811
(58) Field of Search ................................. 318/439, 254, 318/138; 388/801, 808, 809, 811

(56) References Cited

U.S. PATENT DOCUMENTS

| | | | | |
|---|---|---|---|---|
| 4,894,598 A | * | 1/1990 | Daggett | 318/568.16 |
| 4,914,725 A | * | 4/1990 | Belser et al. | 318/560 |
| 5,089,761 A | | 2/1992 | Nakazawa | 318/811 |
| 5,187,417 A | * | 2/1993 | Minnich et al. | 318/254 |
| 5,461,293 A | | 10/1995 | Rozman et al. | 318/603 |
| 5,563,980 A | | 10/1996 | Chen et al. | 388/811 |
| 5,642,461 A | * | 6/1997 | Lewis | 388/812 |
| 5,854,877 A | * | 12/1998 | Lewis | 388/812 |
| 5,978,547 A | | 11/1999 | Reynolds et al. | 388/811 |

FOREIGN PATENT DOCUMENTS

| | | |
|---|---|---|
| EP | 61106088 | 5/1986 |
| EP | 62203596 | 9/1987 |
| EP | 0734115 | 9/1996 |
| EP | 0883233 | 12/1998 |

* cited by examiner

Primary Examiner—Rita Leykin

(57) ABSTRACT

A commutation and velocity control system of a brushless DC motor receives a velocity command signal and provides command signals to drive the brushless DC motor. The system includes a summer that receives the velocity command signal and a velocity feedback signal and provides a velocity error signal indicative of the difference. A velocity loop compensator receives said velocity error signal and provides a compensated velocity error signal. A magnitude sensing circuit senses the magnitude of said compensated velocity error signal and provides a velocity magnitude signal indicative thereof. A polarity sensing circuit senses the polarity of the said compensated velocity error signal and provides a velocity polarity signal indicative thereof. The system also includes an integrated circuit having: (i) a velocity calculation circuit that receives a first sampled digitized signal indicative of resolver position at a first time and a second sampled digitized signal indicative of resolver position at a second time, and determines velocity based upon the difference between said first and second sampled digitized signals and provides a sensed digitized velocity signal indicative thereof; (ii) a commutation logic circuit that receives said first sampled digitized signal, said velocity magnitude signal and said velocity polarity signal, and provides said command signal; and (iii) a counter that receives a signal indicative of said sensed digitized velocity signal and provides a pulse width modulated output signal indicative thereof. A filter receives said pulse width modulated output signal and generates said velocity feedback signal.

8 Claims, 6 Drawing Sheets

```
IF MAGNITUDE > 180 DEG. ELEC.
        IF SIGN IS NEG, ADD 360 DEG. ELEC.
    ELSE
        IF SIGN IS POS, SUBTRACT 360 DEG. ELEC.
    ELSE
        OUTPUT = INPUT
```

US 6,891,346 B2

COMMUTATION AND VELOCITY CONTROL SYSTEM FOR A BRUSHLESS DC MOTOR

PRIORITY DATA

This application claims priority from a provisional application filed Dec. 30, 2000 designated serial No. 60/259,354 entitled "Commutation and Velocity Control System For Brushless DC Motor"". This application is hereby incorporated by reference.

This invention was made with government support under Contract No. F04701-88-C-0042. The U.S. Government therefore has certain rights in this invention.

BACKGROUND OF THE INVENTION

The present invention relates to DC brushless motors, and in particular to a commutation and velocity control system for a brushless DC motor.

Brushless DC motors are in widespread use. A brushless DC motor employs a permanently magnetized rotor and electronic commutation to switch current to appropriate stator windings to cause the rotor to rotate to follow switched magnetic poles in the stator windings. Brushless DC motors may be commutated by signals generated from the rotational velocity and position of the rotor to cause the appropriate stator winding to be switched to sustain rotation. Furthermore, brushless DC motors may be commutated by an external frequency source to cause the rotor to rotate at a rotational velocity synchronous with the external signal source. Mechanisms for detecting the rotational velocity and position of the rotor include resolver windings, Hall effect devices, optical position sensors, etc.

Brushless DC motors often achieve brushless commutation by the use of the resolver that is rotationally coupled to an armature shaft and a pair of resolver windings, respectively producing output signals sineθ and cosineθ, where θ is the angular position of the shaft, which are used to control the windings for driving the armature. From these position signals, velocity must be derived in order to control the commutation.

There is a need for a simplified commutation and velocity control system for a brushless DC motor.

SUMMARY OF THE INVENTION

Briefly, according to an aspect of the present invention, a commutation and velocity control system of a brushless DC motor receives a velocity command signal and provides command signals to drive the brushless DC motor. The system includes a summer that receives the velocity command signal and a velocity feedback signal and provides a velocity error signal indicative of the difference. A velocity loop compensator receives the velocity error signal and provides a compensated velocity error signal. A magnitude sensing circuit senses the magnitude of the compensated velocity error signal and provides a velocity magnitude signal indicative thereof. A polarity sensing circuit senses the polarity of the compensated velocity error signal and provides a velocity polarity signal indicative thereof. The system also includes an integrated circuit having: (i) a velocity calculation circuit that receives a first sampled digitized signal indicative of resolver position at a first time and a second sampled digitized signal indicative of resolver position at a second time, and determines velocity based upon the difference between the first and second sampled digitized signals and provides a sensed digitized velocity signal indicative thereof; (ii) a commutation logic circuit that receives the first sampled digitized signal, the velocity magnitude signal and the velocity polarity signal, and provides the command signal; and (iii) a counter that receives a signal indicative of the sensed digitized velocity signal and provides a pulse width modulated output signal indicative thereof. A filter receives the pulse width modulated output signal and generates the velocity feedback signal.

The present invention provides a simplified commutation and velocity control system for a brushless DC motor.

These and other objects, features and advantages of the present invention will become apparent in light of the following detailed description of preferred embodiments thereof, as illustrated in the accompanying drawings.

DETAILED DESCRIPTION OF THE INVENTION

Figure 1:
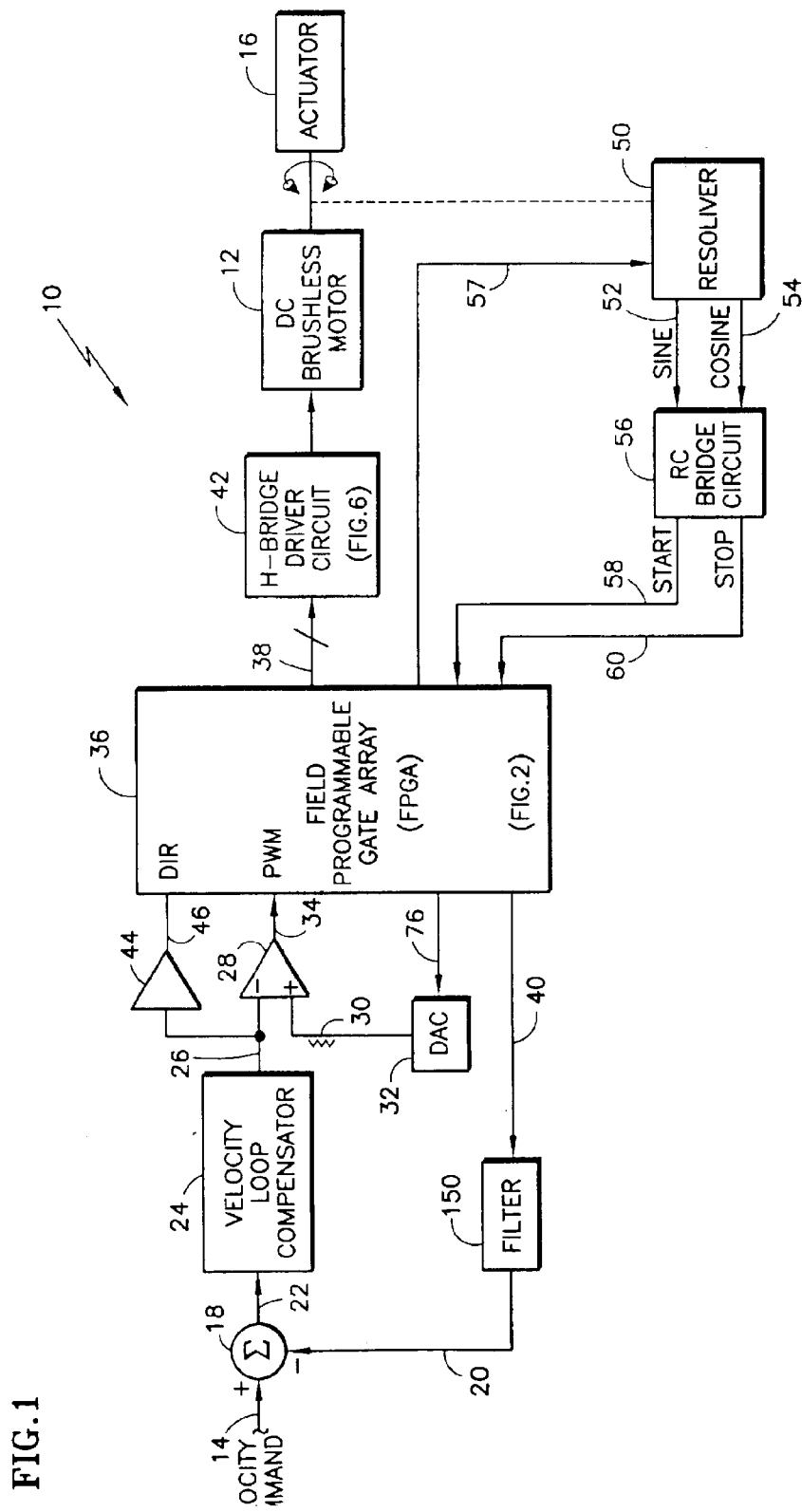
FIG. 1 is a block diagram illustration of a commutation and velocity control system for a brushless DC motor.

FIG. 1 is a block diagram illustration of a commutation and velocity control system 10 for a brushless DC motor 12. The system 10 receives a velocity command signal on a line 14, which for example may be provided by a control loop (not shown) that operates closed loop on the position of an actuator 16 driven by the brushless DC motor 12. The velocity command signal is input to a summer 18 that computes the difference between the commanded velocity and actual velocity, which is provided by a velocity feedback signal on a line 20. The summer 18 provides an error signal on a line 22 indicative of the error between commanded and actual velocity. This error signal is input to a velocity loop compensator 24 that provides an analog velocity error signal (e.g., a voltage signal) on a line 26 to a comparator 28.

The comparator 28 also receives a signal on a line 30 from a digital-to-analog converter (DAC) 32. The output of the DAC 32 on the line 30 is a triangular waveform that allows the comparator 28 to provide a pulse-width-modulated (PWM) output signal on a line 34, whose pulse width is indicative of the magnitude of the velocity error signal on the line 26.

The PWM output signal on the line 34 is input to an application specific integrated circuit, such as for example a field programmable gate array (FPGA) 36. Significantly, the FPGA 36 provides command signals on lines 38 to control the brushless DC motor 12, and also provides a signed brushless DC motor rotor velocity signal on a line 40 for the analog velocity loop. The command signals on the lines 38 are output to a H-bridge driver circuit 42, which preferably includes a plurality of FETs arranged to drive the motor 12.

Since the PWM signal on the line 34 contains only information indicative of the magnitude of the velocity error, the system 10 also includes a comparator 44 that receives the velocity error signal on the line 26 to determine the direction/polarity of the error. That is, if the velocity error signal on the line 26 is positive, then the comparator 44 provides a Boolean signal (DIR) on a line 46 that is logical one. Otherwise, if the velocity error signal on the line 26 is negative, the comparator 44 provides a Boolean signal on the line 46 that is logical zero. Therefore, the signals on the lines 34, 46 (PWM and DIR, respectively) together provide magnitude and polarity information indicative of the velocity error on the line 26.

To provide feedback information, the system 10 also includes a motor shaft position resolver 50. The resolver 50 provides a sine signal on a line 52 and a cosine signal on a line 54 to a resolver signal processing interface 56, which is configured as an RC bridge circuit. The sine and cosine signals from the resolver signal processing interface 56 are separated by $(2*\theta)-90°$, where $\theta$ is in resolver degrees. If the sine and cosine signals on the lines 52, 54 respectively, indicate that $\theta$ is equal to 90°, the output of the RC bridge circuit 56 is $(2*90°)-90°$, which is 90° electrical. The brushless DC motor 12 preferably has four pole pairs and the resolver has two pole pairs to accommodate a direct $(2*\theta)$ to electrical degrees. In this embodiment, resolver receives an excitation signal on a line 57, which is a 23.4375 KHz sine wave whose frequency is counted down in the FPGA 36 by 1024 from the 24 MHz clock. In this case the following equivalents apply:

One electrical cycle: 360 deg electrical=90 degrees mechanical=180 deg res.
One resolver cycle: 360 deg. res.=180 deg mechanical
One commutation step of six steps=60 deg electrical=30 degree res.

The RC bridge circuit 56 provides start and stop signals on lines 58, 60 to the FPGA 36. These signals control a counter located within FPGA that provides an indication of $(2*\theta)$, that is resolver position.

Figure 2:
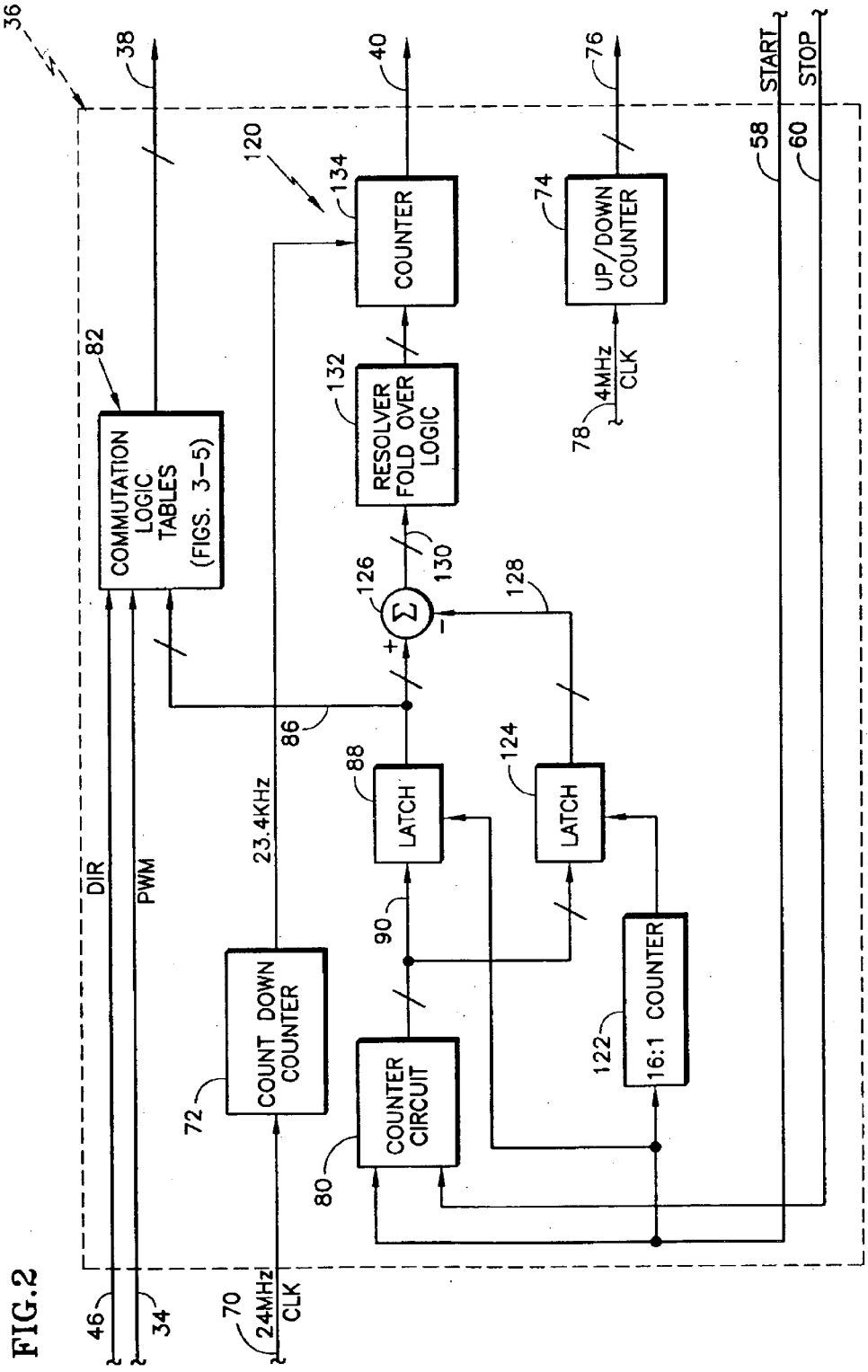
FIG. 2 is a block diagram illustration of the FPGA.

FIG. 2 is a block diagram illustration of the FPGA 36. The FPGA receives a clock pulse (e.g., 24 MHz) on a line 70. The clock signal is input to a counter(s) 72 that generates slower clock signals (e.g., 4 MHz and 23.4375 KHz) from the clock input. The FPGA also includes an up/down counter 74 (e.g., a seven bit counter) that cycles between a one hundred (100) ascending and descending count (i.e., it steps from 0 counts to 100 counts in steps of one, and then from 100 to 0 in steps of one count, and then repeats). The up/down counter 74 provides a count signal on a line 76 to the DAC 32 (FIG. 1), which generates the triangle waveform provided on the line 30. For example, a 4 Mhz clock signal on a line 78 may be used to drive the up/down counter 74, such that a full cycle of two hundred steps results in the DAC 32 providing a triangle waveform having a frequency of 20 KHz.

The FPGA 36 receives the start and stop signals on the lines 58, 60, which are used to control a counter 80. This counter 80 (e.g., a ten bit counter) operates at a 23.4375 KHz rate (a 42.67 μsec. period) preferably on the negative edge zero crossing. Selection of the resolver pole count at one-half times the motor pole count and use of the RC bridge for pre-processing, the start signal on the line 58 is separated from the stop signal on the line 60 by $(2*\theta)$ degrees resolver (e.g., a four pole motor and a two pole resolver). The value $(2*\theta)$ is a direct measurement of the electrical angle, where the following relationships apply:

1. $(2*\theta)$ full scale=360° degrees electrical=180 degrees resolver;
2. the resolver excitation period is equal to 42.667 μsec.;
3. the counter is 10 bits (i.e., 1024 states);
4. the clock is 24 MHz; and
5. the resolver excitation is 23.4375 KHz derived from the 24 MHz clock.

Therefore, based upon these relationships (i.e., this embodiment), the commutation granularity is equal to 360°/1024=0.3515625° electrical/count. In addition for six step commutation (i.e., 60° electrical/step), in this embodiment the relationship between counts/step is [(60° electrical/step)/(0.3515625° electrical/count)], which is equal to 170.6667 counts/step. As a result, as the resolver 50 (FIG. 1) rotates with the motor shaft, the angle and the value from the counter 80 change proportionally. Commutation state changes occur as the ten bit count value progresses past defined thresholds stored in the FPGA 36 in commutation logic tables 82. The commutation logic tables provide the output signals on the lines 38 that control the motor drive circuit 42 (FIG. 1) by providing the phase switching information (commutation) for the three phase brushless DC motor. By switching in the proper sequence, the motor 12 (FIG. 1) is provided energy to cause rotation of the permanent magnet rotor in either direction. Variation of the energy is by pulse width modulation of the commutation pulse.

The commutation logic tables 82 receive the signal indicative of velocity error polarity (i.e., DIR) on the line 46 and the signal on the line 34 indicative of the magnitude of the velocity error (i.e., PWM). The commutation logic tables 82 also receive a signal on a line 86 indicative of the resolver angle. This signal is provided by a latch 88 that receives a count signal on a line 90 from the counter circuit 80.

Figure 3:
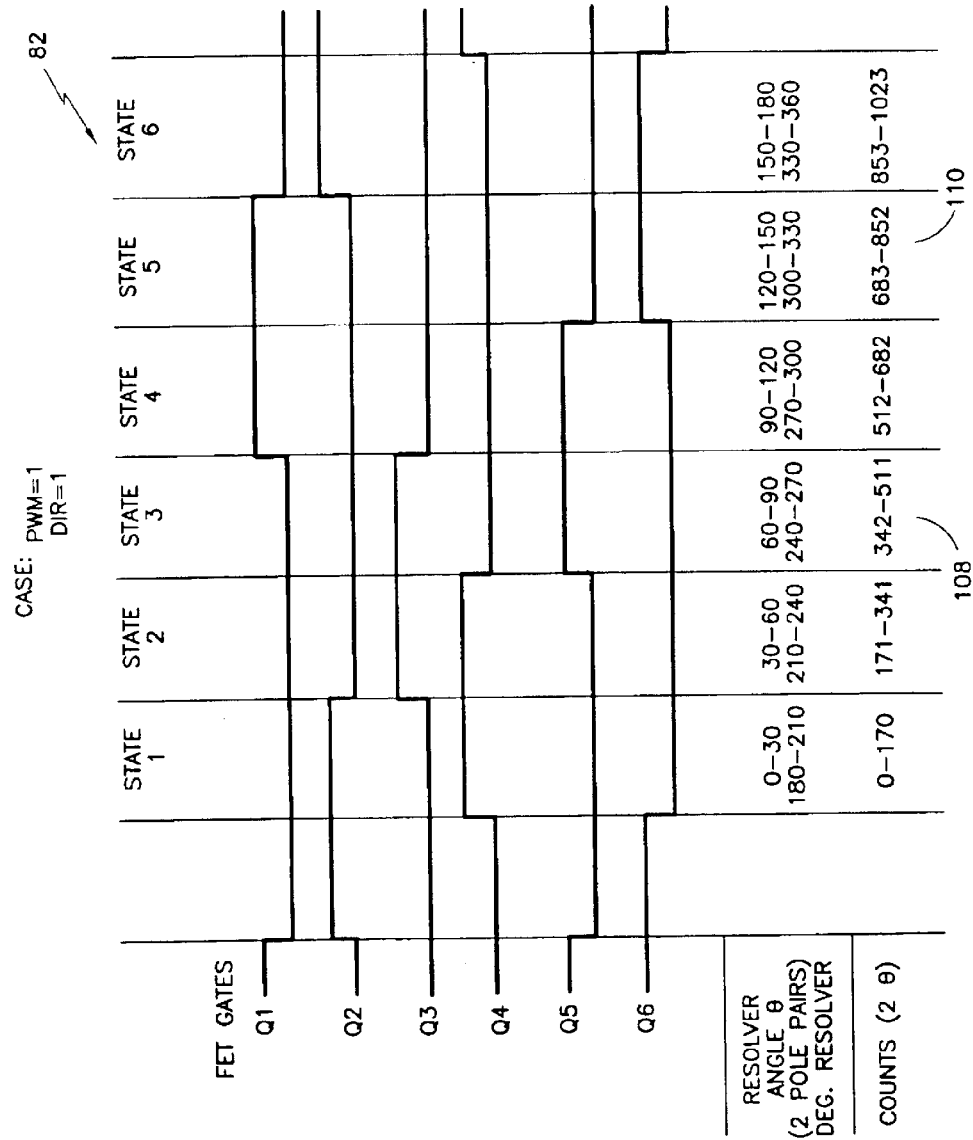
FIGS. 3–5 illustrates commutation logic tables resident in the FPGA of FIG. 2.
Figure 4:
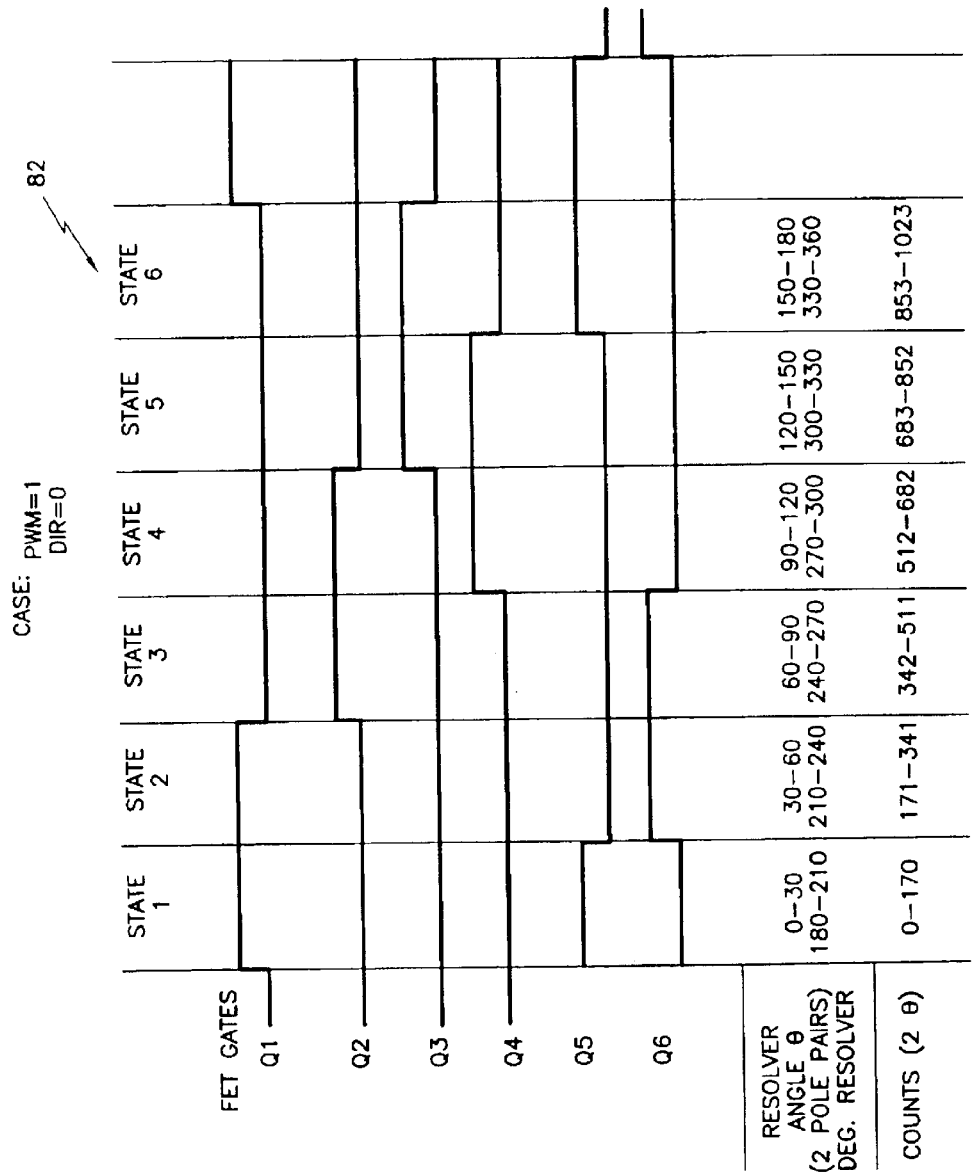
Figure 5:
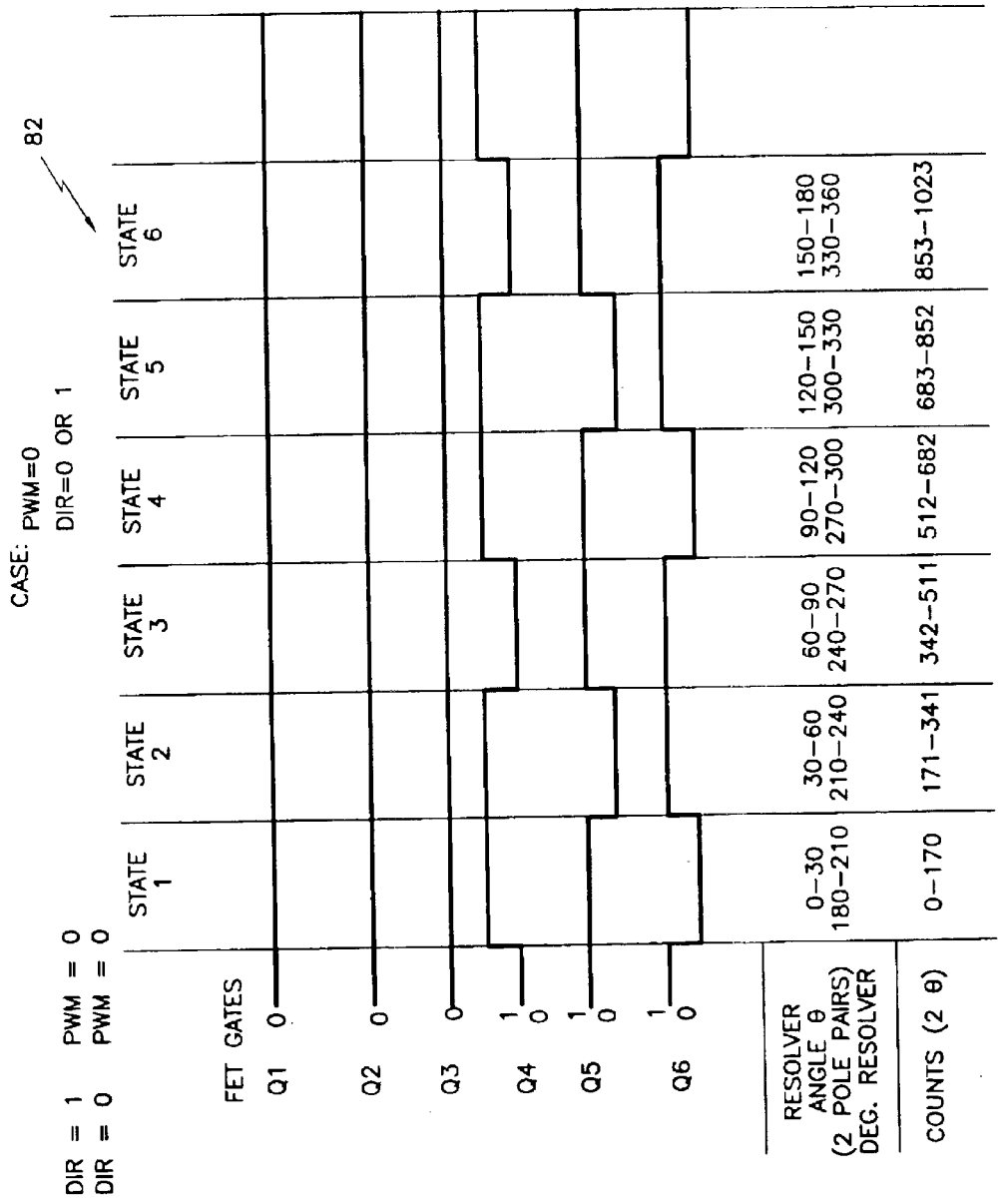
Figures 6, 7:
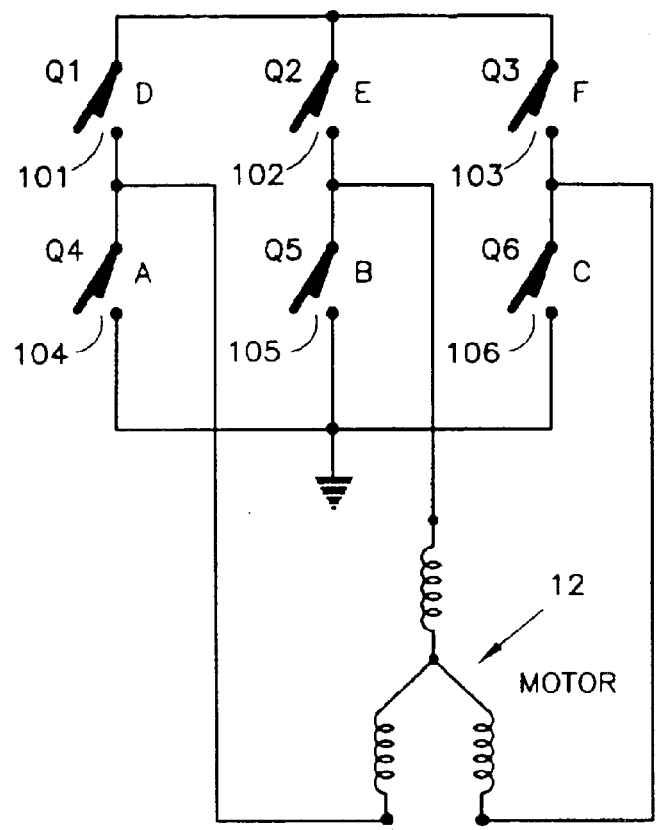
FIG. 6 is a simplified illustration of a bridge driver circuit.
FIG. 7 is a block diagram illustration of the resolver folder over logic.

The commutation logic tables 82 determine the state of the motor driver circuit based upon the velocity error (i.e., the signal on the lines 46 and 34) and the resolver angle (i.e., the signals on the lines 86). FIG. 3 illustrates a commutation logic table for the case DIR=1 and PWM=1. FIG. 4 illustrates a commutation logic table for the case DIR=0 and PWM=1. FIG. 5 illustrates the commutation logic table for the case: (i) PWM=0 and DIR=0 and (ii) PWM=0 and DIR=1. FIG. 6 is a simplified block diagram illustration of the bridge driver circuit 42. The bridge driver circuit 42 includes a plurality of current switches (e.g., FETs) Q1-Q6 101–106 that drive the three phase brushless DC motor 12.

Referring now to FIGS. 3 and 6, if DIR=1, PWM=1 and the signal on the line 86 is equal to 511 counts, then the current switches Q1-Q6 101–106 are positioned as set forth in column 108. Similarly, if the signal on the line 86 indicative of resolver angle is equal to 700 counts, then the current switches Q1-Q6 101–106 are positioned as set forth in column 110. FET off to FET on dead time may be required to avoid "H" bridge common leg high side switch (HSS) and low side switch (LSS) coincident "on" times. Dead Time avoids common "H" leg coincident FET switch "on" states. For example, the dead time may be 1.5 μsec to accommodate the rise and fall times of the FET drivers when reversing directions and when normal commutation for PWM=1 transitions to PWM=0.

Referring again to FIG. 2, to provide the feedback signal on the line 40 indicative of velocity, the FPGA also includes velocity calculation circuitry 120 that computes the velocity using two sampled position signals divided by time. Specifically, counter 122 (e.g., a divide by sixteen counter) receives the start signal on the line 58 and every sixteen start pulses, the counter 120 clocks a latch 124 to sample the count value on the line 90. As a result, the latch 124 is clocked at one-sixteenth the rate of the latch 88. In this embodiment the velocity calculations are updated every sixteenth position update. A summer 126 receives the count signal on the line 86 and a count signal on a line 128 from the latch 124, and provides a difference signal indicative of the difference on a line 130. The difference signal is input to resolver folder over logic 132. FIG. 7 is a block diagram illustration of the resolver folder over logic. This logic accounts for the resolver data captured near and through the resolver points. Velocity is counted as long as the clock signal is active. The fold over logic 132 provides an output signal to a counter 134 (e.g., a ten bit counter) that provides a signed PWM output (e.g., 0 to 5 VDC) on the line 40 indicative of velocity. For example, zero velocity is represented by 50% duty cycle, while fill-scale negative velocity is represented by 0% duty cycle and full scale positive velocity is represented by 100% duty cycle. The counter 134 preferably also includes overflow protection to ensure that if velocity exceeds a certain threshold (e.g., ±5,493 RPM), then the 0% or 100% duty cycle is provided depending of course of the polarity of the velocity. Down stream external bipolar filtering and offset provided by filter 150 (FIG. 1) provides the signed positive and negative velocity feedback voltage scaling.

Although the present invention has been discussed in the context of working with a four pole motor and a two pole resolver, one of ordinary skill will of course appreciate the present invention is certainly not limited to such systems.

Although the present invention has been shown and described with respect to several preferred embodiments thereof, various changes, omissions and additions to the form and detail thereof, may be made therein, without departing from the spirit and scope of the invention.

What is claimed is:

1. A commutation and velocity control system of a brushless DC motor that receives a velocity command signal and provides command signals to drive the brushless DC motor, said system comprising:

a summer that receives the velocity command signal and a velocity feedback signal and provides a velocity error signal indicative of the difference;

a velocity loop compensator that receives said velocity error signal and provides a compensated velocity error signal;

a magnitude sensing circuit that senses the magnitude of said compensated velocity error signal and provides a velocity magnitude signal indicative thereof;

a polarity sensing circuit that senses the polarity of the said compensated velocity error signal and provides a velocity polarity signal indicative thereof;

an integrated circuit that includes

A) a velocity calculation circuit that receives a first sampled digitized signal indicative of resolver position at a first time and a second sampled digitized signal indicative of resolver position at a second time, and determines velocity based upon the difference between said first and second sampled digitized signals and provides a sensed digitized velocity signal indicative thereof;

B) a commutation logic circuit that receives said first sampled digitized signal, said velocity magnitude signal and said velocity polarity signal, and provides said command signal;

C) a counter that receives a signal indicative of said sensed digitized velocity signal and provides a pulse width modulated output signal indicative thereof; and a filter that receives said pulse width modulated output signal and generates said velocity feedback signal.

2. The commutation and velocity control system of claim 1, wherein said integrated circuit is configured as a field programmable gate array (FPGA).

3. The commutation and velocity control system of claim 2, further comprising:

a bridge circuit that receives a sine signal component and a cosine signal component from a resolver, and generates a first resolver signal and a second resolver signal separated by (2*θ), where θ is indicative of a resolver electrical angle;

wherein said FPGA comprises a counter that receives said a first resolver signal and a second resolver signal and generates a count signal indicative of resolver position;

a first latch that receives said count signal and generates said first sampled digitized signal;

a second latch that receives said count signal and generates said first sampled digitized signal; and a summer that computes the difference between said first and second sampled digitized signal and provides said sensed digitized velocity signal.

4. The commutation and velocity control system of claim 3, wherein said FPGA comprises an up/down counter that cycles back and forth between zero counts and a fixed count value and provides a cycling count signal.

5. The commutation and velocity control system of claim 4, wherein said magnitude sensing circuit comprises:

a digital-to-analog converter that receives said cycling count signal and provides an triangular waveform signal; and a first comparator that receives said triangular waveform signal and said compensated velocity signal and provides said velocity magnitude signal as a pulse width modulated signal whose duty cycle is indicative of the magnitude of the velocity.

6. The commutation and velocity control system of claim 5, wherein said polarity sensing circuit comprises:

a second comparator that receives said compensated velocity signal and provides said velocity polarity signal as a Boolean signal whose value is indicative of the polarity of said compensated velocity signal.

7. The commutation and velocity control system of claim 6, comprising a H-bridge driver circuit that includes a plurality of FETs responsive to said command signals to drive the brushless DC motor.

8. A commutation and velocity control system of a brushless DC motor that receives a velocity command signal and provides command signals to drive the brushless DC motor, said system comprising:

a summer that receives the velocity command signal and a velocity feedback signal and provides a velocity error signal indicative of the difference;

means responsive to said velocity error signal for providing a compensated velocity error signal;

means for sensing the magnitude of said compensated velocity error signal and for provides a velocity magnitude signal indicative thereof;

means for sensing the polarity of the said compensated velocity error signal and for providing a velocity polarity signal indicative thereof;

an integrated circuit that includes

A) means for receiving a first sampled digitized signal indicative of resolver position at a first time and a second sampled digitized signal indicative of resolver position at a second time, and for determining velocity based upon the difference between said first and second sampled digitized signals, and for providing a sensed digitized velocity signal indicative thereof;

B) commutation logic means that receives said first sampled digitized signal, said velocity magnitude signal and said velocity polarity signal, for providing said command signal;

C) means responsive to a signal indicative of said sensed digitized velocity signal and for providing a pulse width modulated output signal indicative thereof; and a filter that receives said pulse width modulated output signal and generates said velocity feedback signal.

* * * * *